United States Patent

Hojnacki et al.

[11] Patent Number: 5,107,680
[45] Date of Patent: Apr. 28, 1992

[54] HYDRAULIC CYLINDER

[75] Inventors: Steven R. Hojnacki, Sterling Heights; Richard A. Nix, Auburn Hills, both of Mich.

[73] Assignee: Automotive Products plc, Warwickshire, England

[21] Appl. No.: 730,009

[22] Filed: Jul. 15, 1991

[51] Int. Cl.$^5$ .............................................. F15B 7/00
[52] U.S. Cl. .................................. 60/533; 92/171.1; 92/169.1
[58] Field of Search ............... 92/171.1, 169.1, 169.2, 92/169.3, 169.4; 60/533

[56] References Cited

U.S. PATENT DOCUMENTS 2,759,329  8/1956  Ponti ................................ 92/171.1
5,046,315  9/1991  Nakamura et al. ............... 92/171.1

FOREIGN PATENT DOCUMENTS 0008999  1/1980  Japan ............................... 92/171.1

Primary Examiner—Edward K. Look
Assistant Examiner—Thomas Denion
Attorney, Agent, or Firm—Krass & Young

[57] ABSTRACT

An end cap adapted to be inserted into one end of a hydraulic cylinder having a body of plastic material defining a bore open at one end thereof and an end wall at the other end thereof closing the bore. A cylindrical tube is positioned within the bore and a piston is reciprocal within the tube. The end cap sandwiches the tube between the end cap and the end wall and the end cap includes radially extending circumferentially spaced ribs which collapse against the tube as the end cap is inserted into the cylinder.

8 Claims, 2 Drawing Sheets

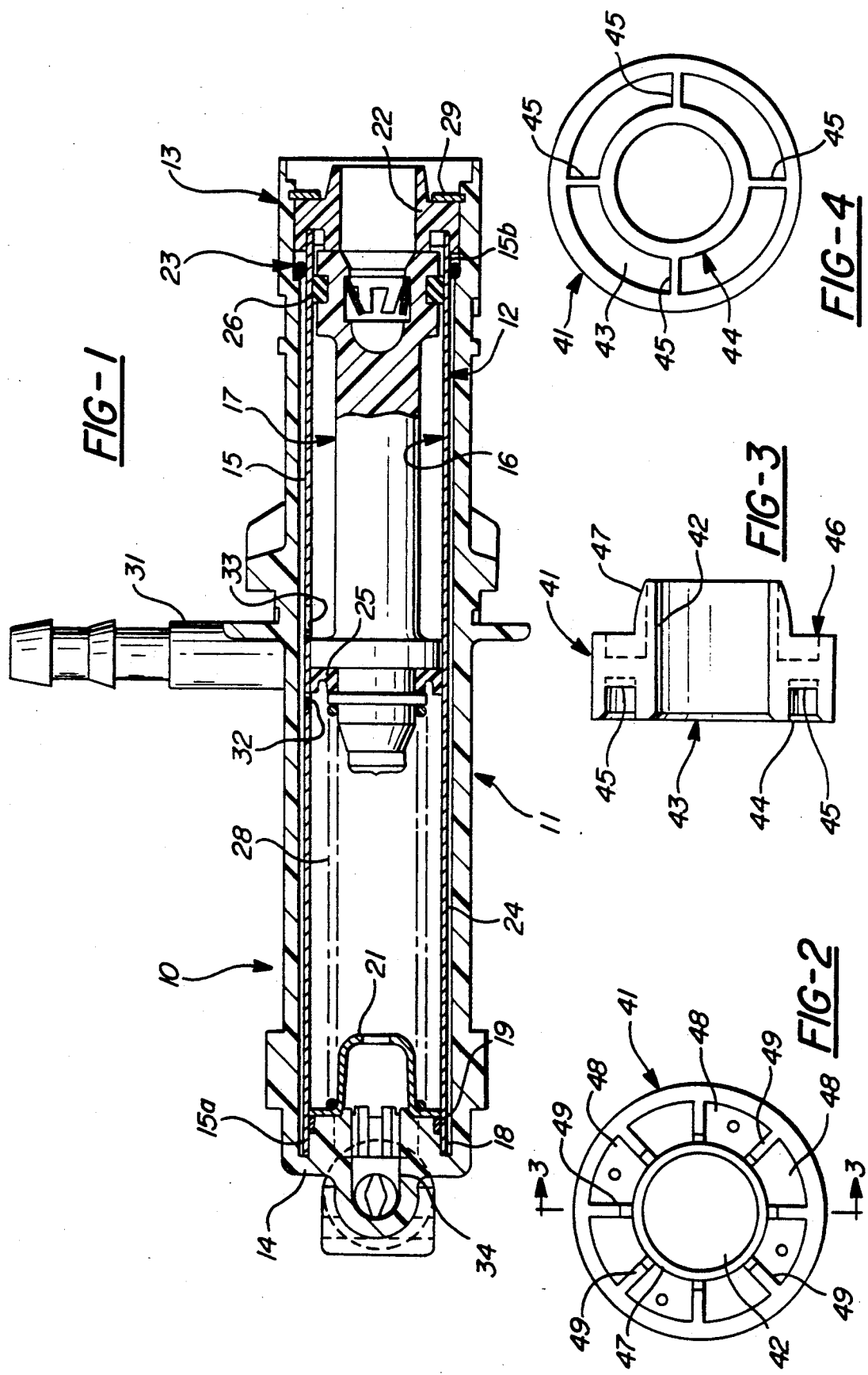

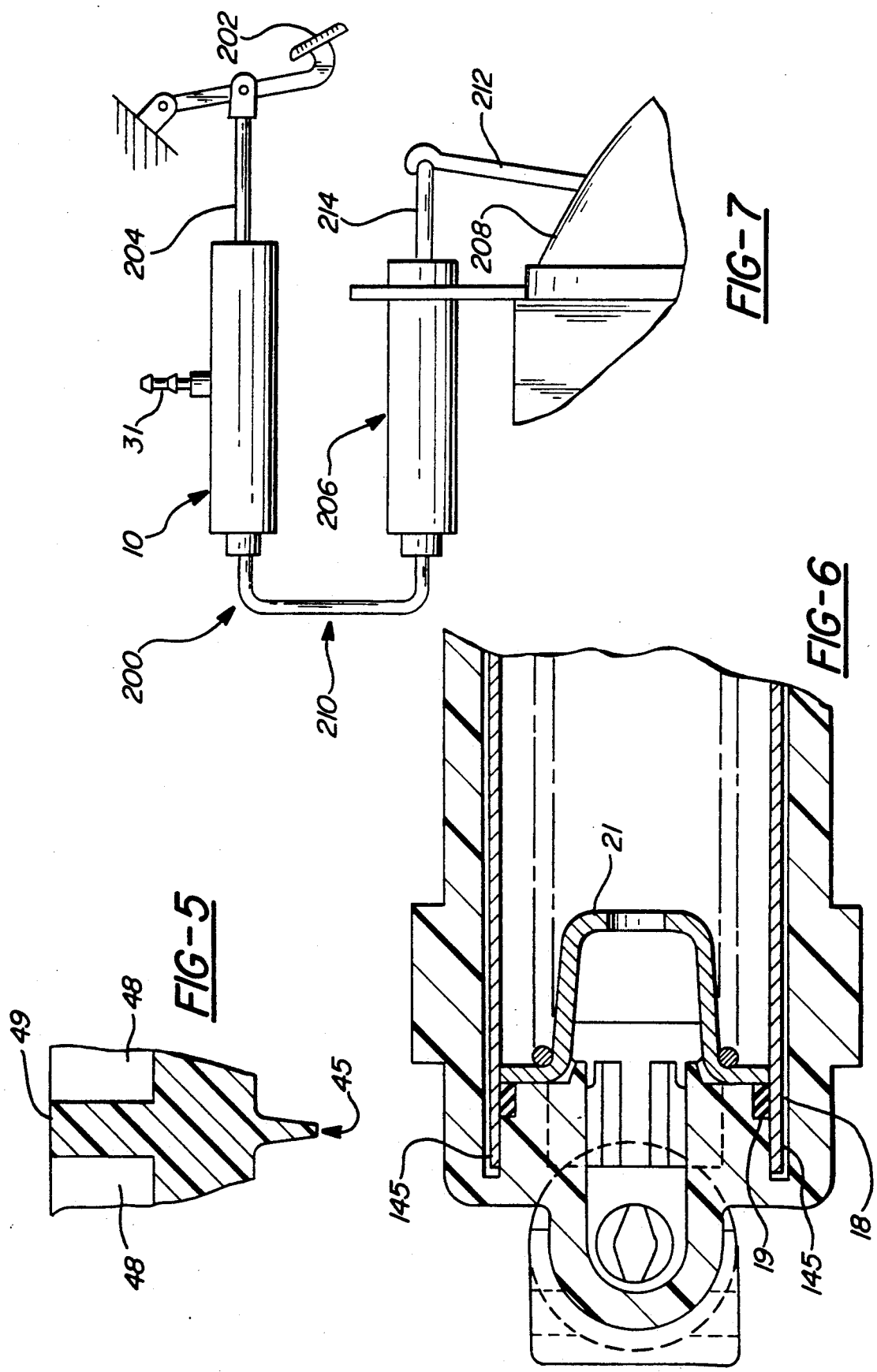

5,107,680

HYDRAULIC CYLINDER

FIELD OF THE INVENTION

The is invention relates to a hydraulic cylinder and in particular to a hydraulic cylinder for use in hydraulic clutch actuator systems for motor vehicles.

BACKGROUND OF THE INVENTION

In U.S. Pat. No. 4,785,721 the present assignee has disclosed a hydraulic master cylinder having a plastic molded body with a bore therein lined by a seamless steel tube in which a piston is reciprocable. The tube is held in the bore by an end cap.

A problem has arisen during manufacture of the hydraulic cylinders in that a build up of manufacturers'tolerances can occur during the manufacture of the tube, cylinder body, end cap etc., so that the end cap may not correctly locate on the tube and there may be some axial play between the tube and the end cap, or cylinder body which allow longitudinal displacement of the tube relative to the body. One means of overcoming this problem is to place a resilient spring washer between the end of the tube and the end cap.

SUMMARY OF THE INVENTION

The present invention provides a method of assembling hydraulic actuator cylinders which is simple and reliable and eliminates the aforesaid spring washer.

Accordingly there is provided a hydraulic cylinder having a body of synthetic plastic material with a bore therein open at one end thereof and an end wall at the other end thereof, the bore lined by a cylindrical tube in which a piston is reciprocable, the bore having an end cap at its open end which sandwiches the tube between end cap and the end wall, wherein at least one end of the tube abuts ribs on at least one of the end cap and the end wall, and the ribs are collapsible to accommodate the tube when the end cap is located in the open end.

Preferably the ribs are on the end cap and are arranged as radial ribs.

BRIEF DESCRIPTION OF THE DRAWINGS

FIG. 1 is a section through a hydraulic master cylinder according to the present invention;

FIG. 2 is a view showing one side of an end cap employed in the cylinder of FIG. 1;

FIG. 3 is a section taken on line 3—3 of FIG. 2;

FIG. 4 is a view of the other side of the end cap shown in FIG. 2;

FIG. 5 is an enlarged section taken on line 5—5 of FIG. 4 showing a radial rib in section;

FIG. 6 is a fragmentary sectional view of an alternative embodiment showing the ribs on the end wall of the master cylinder body; and FIG. 7 shows a master cylinder according to the invention employed in a hydraulic clutch actuator.

DETAILED DESCRIPTION OF THE PREFERRED EMBODIMENT

With reference to FIG. 1 of the drawings there is illustrated in longitudinal cross section a hydraulic master cylinder 10 of the type used in a motor vehicle hydraulic clutch actuation system. The hydraulic master cylinder comprises a body 11 molded from a synthetic plastics material, for example phenolic resin, polyamide, and the like, having an internal bore 12. The bore 12 has an open end or mouth 13 at one end thereof and an end wall 14 at the other end thereof and the bore diameter is slightly tapered, having a slightly larger diameter at its open end 13 to facilitate molding.

The bore 12 is lined by a cylindrical tube 15 made from a length of seamless steel tubing. The inner surface 16 of the tube provides a working surface for a piston 17 reciprocable within the tube 15.

The tube 15 has its inner end portion 15a received in an annular recess 18 formed in the end wall 14 coaxial with the bore 12 and is internally sealed to the end wall by an annular seal 19. The seal 19 is retained in position by a retainer cup 21. The outer end portion 15b of the tube 15 is centered and located on an end cap 22 located in the open mouth 13 of the bore. The tube 15 is externally sealed to the mouth 13 of the bore 12 by a ring seal 23. The end cap 22 holds the tube 15 spaced from the body 11 so that an annular gap 24 exists between the tube 15 and the body 11 for most of the length of the tube.

The piston includes a primary seal 25 at its inner end portion, and a secondary seal 26 at its portion adjacent the mouth 13 of the bore 12. The piston 17 is biased towards the open end of the tube 15 by a spring 28 acting between the seal retainer cup 21 and the piston. The piston is biased in "at rest" condition into abutment with the end cap 22 which is retained in the mouth 13 of the bore 12 by a circlip 29. In this condition hydraulic fluid is fed via an inlet spigot 31 into the annular gap 24 around the sleeve 25 and enters tube 15 via a first port 32 just in front of the primary seal 25 and a second port 33 located between the two seals 25 and 26.

During operation of the master cylinder the piston 17 moves inwardly under an input load towards the end wall 14, and the first inlet port 32 is cut off by a seal 26 and fluid is then displaced out of the tube 15 through an outlet port 34 in the end wall 14.

The end cap 22, shown in detail in FIGS. 2 to 5, is an annular cap having an outer cylindrical surface 41, which is a slide fit in the mouth 13 of the bore 12, and a central coaxial hole 42 which in use accommodates a push rod. The inner face 43 of the end cap has an annular recess 44 therein arranged coaxially of the bore 12 and the radially outer surface of which provides a location for the tube 15. The base of recess 44 has raised ribs 45 thereon that project axially inwardly of the bore 12. The ribs 45 are preferably arranged as radially extending ribs, and comprise four circumferentially spaced ribs 45.

The outer face 46 of the end cap has a coaxial central spigot 47 thereon projecting axially away from the bore 12. Outer face 46 has a number of cavities 48 therein to reduce material thickness, these cavities being spaced from each other by radial webs 49.

The end cap is molded from a plastics material, preferably a nylon material, and more preferably a glass filled nylon (13% glass filled).

The ribs 45 are approximately 0.75 mm thick at the base and has a 0.25 mm radius at the tip, and are about 1.3 mm in height. When the end cap 22 is fitted to the master cylinder the ribs 45 abut the tube 15 and sufficient load is applied to the cap 22 to crush the ribs 45 against the tube and cause the ribs 45 to collapse. A typical load to crush the ribs is 1625N.

The crushed ribs take out any manufacturing tolerances in that the ribs crush only so far as is necessary to accommodate the tube 15.

FIG. 6 shows an alternative construction in which ribs 145 are located in the base of the recess 18 in the end wall 14. In all other matters the ribs are as previously described above with respect to the end cap 22.

Hydraulic master cylinder 10 is employed as a part of a hydraulic clutch actuator assembly 200, seen in FIG. 7, including hydraulic cylinder 10, a clutch pedal 202 controlling a push rod 204 comprising the input push rod of the cylinder 10, a slave cylinder 206 secured to the clutch housing 208 of the associated vehicle, a conduit 210 connecting the output of the master cylinder to the input of the slave cylinder, and a clutch release lever 212 operated by the output rod 214 of the slave cylinder and operative in known manner to engage and disengage the clutch in response to reciprocal movement of the slave cylinder output rod 214 upon depression and release of clutch pedal 202. Clutch actuator 200 is preferably assembled, filled with hydraulic fluid, and tested before fitting on the vehicle.

The above embodiment is by way of example only and modifications and alterations may be made without departing from the spirit of the invention.

We claim:

1. A hydraulic cylinder having a body of synthetic plastic material with a bore therein open at one end thereof and a wall at the other end thereof, the bore being line by a cylindrical tube in which a piston is reciprocable, the body having an end cap at its open end which sandwiches the tube between the end cap and the end wall, wherein at least one of the ends of the tube abuts ribs on at least one of said end cap and said end wall, and said ribs being collapsible to accommodate the tube when the end cap is located in said open end.

2. A hydraulic cylinder as claimed in claim 1 wherein the ribs have a thickness of between 0.75-0.5 mm and a height of between 1.2-1.4 mm.

3. A hydraulic cylinder as claimed in claim 1 wherein the end cap is manufactured from glass filled nylon.

4. A hydraulic cylinder as claimed in claim 1 wherein said ribs are on the end cap.

5. A hydraulic cylinder as claimed in claim 4 wherein said ribs comprise circumferentially spaced, radially extending ribs.

6. A hydraulic cylinder as claimed in claim 1 wherein the hydraulic cylinder is a master cylinder.

7. A hydraulic clutch actuator comprising a master cylinder, a slave cylinder, and a conduit interconnecting the master cylinder and the slave cylinder, characterized in that the master cylinder comprises a hydraulic cylinder having a body of synthetic plastic material with a bore therein open at one end thereof and a wall at the other end thereof, the bore being lined by a cylindrical tube in which a piston is reciprocable, the body having an end cap at its open end which sandwiches the tube between the end cap and the end wall, wherein at least one of the ends of the tube abuts ribs on at least one of said end cap and said end wall, and said ribs being collapsible to accommodate the tube when the end cap is located in said open end.

8. A hydraulic clutch actuator as claimed in claim 7 wherein the actuator system is assembled, filled with hydraulic fluid, and tested before fitting on a vehicle.

* * * * *